United States Patent
Yin (10) Patent No.: US 9,930,419 B2
(45) Date of Patent: Mar. 27, 2018

(54) FILE RECOMMENDATION METHOD AND DEVICE

(71) Applicant: TENCENT TECHNOLOGY (SHENZHEN) COMPANY LIMITED, Shenzhen, Guangdong (CN)

(72) Inventor: Chengguo Yin, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/172,207

(22) Filed: Jun. 3, 2016

(65) Prior Publication Data

US 2016/0286277 A1   Sep. 29, 2016

Related U.S. Application Data

(63) Continuation of application No. PCT/CN2015/072275, filed on Feb. 5, 2015.

(30) Foreign Application Priority Data

Dec. 5, 2013 (CN) .......................... 2013 1 0653411

(51) Int. Cl.
*H04N 21/482* (2011.01)
*H04N 21/258* (2011.01)
(Continued)

(52) U.S. Cl.
CPC ....... *H04N 21/4826* (2013.01); *H04N 21/252* (2013.01); *H04N 21/25891* (2013.01);
(Continued)

(58) Field of Classification Search
CPC ......... H04N 21/4826; H04N 21/42218; H04N 21/25891; H04N 21/44222; H04N 21/4532
See application file for complete search history.

(56) References Cited

U.S. PATENT DOCUMENTS 8,843,965 B1* 9/2014 Kurapati ............ H04N 5/44543
725/37
2002/0075320 A1* 6/2002 Kurapati ................ H04N 7/165
715/811
(Continued)

FOREIGN PATENT DOCUMENTS

CN         101568013 A      10/2009
CN         102044009 A       5/2011
(Continued)

OTHER PUBLICATIONS

Chinese Office Action for Application No. 2013106534116 dated Feb. 28, 2015, and an English concise explanation of relevance thereof.
(Continued)

*Primary Examiner* — Pinkal R Chokshi
(74) *Attorney, Agent, or Firm* — Harness, Dickey & Pierce, P.L.C.

(57) ABSTRACT

A file recommendation method includes creating a two-dimensional matrix according to user identifications and file identifications included in a history playing record, wherein the user identifications are a first dimension of the two-dimensional matrix and the file identifications are a second dimension of the two-dimensional matrix. The method includes filling an element location corresponding to a relationship between the user identifications and the file identifications in the two-dimensional matrix with an element. The method includes decomposing the two-dimensional matrix to obtain a designated matrix, and dividing the designated matrix according to the first dimension to obtain a feature vector corresponding to each user identification. The method includes performing group division processing for each user identification according to the feature vector corresponding to the user identification to obtain at least one
(Continued)

user group. The method includes recommending a file according to the at least one user group.

12 Claims, 4 Drawing Sheets

(51) Int. Cl.
    *H04N 21/442*     (2011.01)
    *H04N 21/45*     (2011.01)
    *H04N 21/422*     (2011.01)
    *H04N 21/25*     (2011.01)

(52) U.S. Cl.
    CPC . *H04N 21/42218* (2013.01); *H04N 21/44222* (2013.01); *H04N 21/4532* (2013.01)

(56) References Cited

U.S. PATENT DOCUMENTS

| | | | | |
|---|---|---|---|---|
| 2002/0104087 | A1* | 8/2002 | Schaffer | H04N 7/163 725/46 |
| 2009/0265291 | A1* | 10/2009 | Kobayashi | G06N 99/005 706/12 |
| 2011/0153663 | A1* | 6/2011 | Koren | G06F 17/30964 707/776 |
| 2012/0054148 | A1* | 3/2012 | Flinn | G06F 17/30699 707/603 |
| 2013/0124449 | A1* | 5/2013 | Pinckney | G06F 17/30867 706/52 |
| 2013/0290999 | A1* | 10/2013 | Itakura | H04N 21/252 725/14 |
| 2015/0019640 | A1* | 1/2015 | Li | G06Q 30/0269 709/204 |
| 2015/0143390 | A1* | 5/2015 | Fay | H04N 21/2668 725/9 |
| 2016/0154887 | A1* | 6/2016 | Zhao | G06F 17/30029 707/727 |
| 2016/0165277 | A1* | 6/2016 | Kirillov | H04N 21/251 725/14 |
| 2016/0286277 | A1 | 9/2016 | Yin | |

FOREIGN PATENT DOCUMENTS

| | | |
|---|---|---|
| CN | 102426686 A | 4/2012 |
| CN | 103152618 A | 6/2013 |
| CN | 103209342 A | 7/2013 |
| CN | 103246672 A | 8/2013 |
| CN | 103389966 A | 11/2013 |
| CN | 104079960 A | 10/2014 |
| EP | 2330516 A1 | 6/2011 |

OTHER PUBLICATIONS

International Search Report for Application No. PCT/CN2015/072275 dated May 6, 2015.
International Preliminary Report for Application No. PCT/CN2015/072275 dated Jun. 7, 2016.

\* cited by examiner

FIG. 4

FILE RECOMMENDATION METHOD AND DEVICE

CROSS-REFERENCE TO RELATED APPLICATIONS

This application is a continuation of International Application No. PCT/CN2015/072275, filed on Feb. 5, 2015. This application claims the benefit and priority of Chinese Application No. 201310653411.6, filed on Dec. 5, 2013. The entire disclosures of each of the above applications are incorporated herein by reference.

FIELD

The present disclosure relates to network technologies and to a file recommendation method and device.

BACKGROUND

This section provides background information related to the present disclosure which is not necessarily prior art.

Users are provided with various types of online information, but it is often difficult to access information of personal interest. For user convenience, a server may recommend information of interest for the user according to browsing records, interests, and hobbies of the user.

When a user intends to view a video through a terminal device, a video that is most frequently clicked by other users may be recommended to the user. In other words, the preferences of the user are deduced according to preferences of other users, and thus, an inappropriate video may be recommended to the user that does not align with the preferences of the user.

In the above video recommendation method, it is not considered that the preferences of the user may be different from the preferences of other users. Accordingly, when the preferences of the user are different from the preferences of other users, the video recommendation success rate may be very low.

SUMMARY

This section provides a general summary of the disclosure, and is not a comprehensive disclosure of its full scope or all of its features.

A file recommendation method and device are provided according to various embodiments of the present disclosure. The method is implemented as follows.

The file recommendation method includes:

creating a two-dimensional matrix according to user identifications and file identifications included in a history playing record, wherein the user identifications are a first dimension of the two-dimensional matrix and the file identifications are a second dimension of the two-dimensional matrix;

filling an element location corresponding to a relationship between the user identifications and the file identifications in the two-dimensional matrix with an element;

decomposing the two-dimensional matrix to obtain a designated matrix;

dividing the designated matrix according to the first dimension to obtain a feature vector corresponding to each user identification;

performing group division processing for each user identification according to the feature vector corresponding to the user identification to obtain at least one user group, wherein each user group includes at least one user identification; and recommending a file according to the at least one user group.

The file recommendation device includes:

a matrix creating module to create a two-dimensional matrix according to user identifications and file identifications included in a history playing record, wherein the user identifications are a first dimension of the two-dimensional matrix and the file identifications are a second dimension of the two-dimensional matrix;

a filling module to fill an element location corresponding to a relationship between the user identifications and the file identifications in the two-dimensional matrix with an element;

a matrix decomposing module to decompose the two-dimensional matrix to obtain a designated matrix;

a vector dividing module to divide the designated matrix according to the first dimension to obtain a feature vector corresponding to each user identification;

a group division module to perform group division processing for each user identification according to the feature vector corresponding to the user identification to obtain at least one user group, wherein each user group includes at least one user identification; and a recommending module to recommend a file according to the at least one user group.

Through the method provided by the various embodiments of the present disclosure, the following can be achieved.

Through the method and device provided by the various embodiments of the present disclosure, the user group may be obtained according to the relationship between the user identifications and the file identifications that are included in the history playing record, and the user identifications of users with similar preferences are divided into the same user group. In this case, a file may be recommended to a current user identification according to a user group to which the current user identification belongs, rather than according to all user identifications. Because it is considered that the preferences of a user having the current user identification may be different from the preferences of users having other user identifications, a recommendation efficiency and a recommendation success rate can be improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to describe the method provided by the various embodiments of the present disclosure clearly, the accompanying drawings referred to in the embodiments will be illustrated briefly hereinafter. The accompanying drawings are some examples of the present disclosure, and according to these accompanying drawings, those skilled in the art can obtain other accompanying drawings without creative labor.

Corresponding reference numerals indicate corresponding parts throughout the several views of the drawings.

DETAILED DESCRIPTION

Example embodiments will now be described more fully with reference to the accompanying drawings.

The method provided by the embodiments of the present disclosure will be illustrated clearly and perfectly hereinafter with reference to the accompanying drawings in the embodiments. The described embodiments are only partial embodiments of the present disclosure, but are not all embodiments. According to the embodiments, those skilled in the art can obtain other embodiments without creative labor, which belong to the protection scope of the present disclosure.

Figure 1:
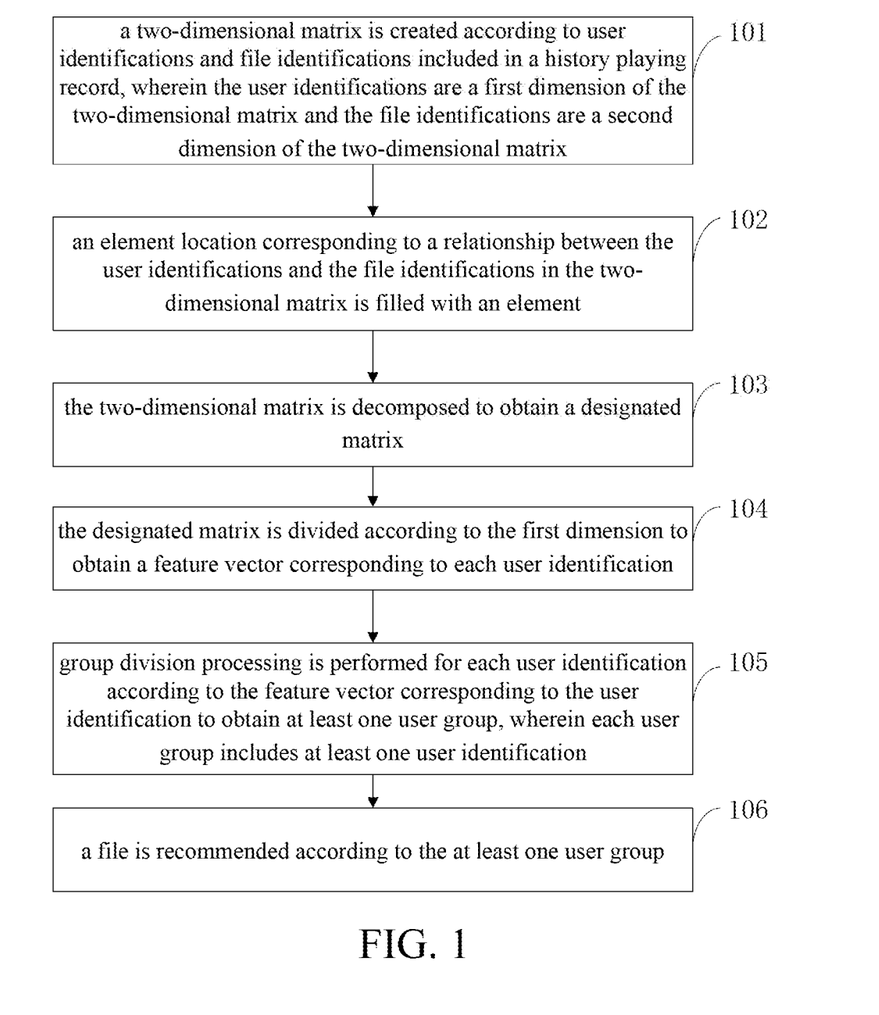
FIG. 1 is a flowchart illustrating a file recommendation method according to various embodiments of the present disclosure.

FIG. 1 is a flowchart illustrating a file recommendation method according to various embodiments of the present disclosure. An entity performing the method process is a server. As shown in FIG. 1, the method includes following blocks.

Block 101: A two-dimensional matrix is created according to user identifications and file identifications included in a history playing record, wherein the user identifications are a first dimension of the two-dimensional matrix and the file identifications are a second dimension of the two-dimensional matrix.

Block 102: An element location corresponding to a relationship between the user identifications and the file identifications in the two-dimensional matrix is filled with an element.

Block 103: The two-dimensional matrix is decomposed to obtain a designated matrix.

Block 104: The designated matrix is divided according to the first dimension to obtain a feature vector corresponding to each user identification.

Block 105: Group division processing is performed for each user identification according to the feature vector corresponding to the user identification to obtain at least one user group, wherein each user group includes at least one user identification.

Block 106: A file is recommended according to the at least one user group.

By the method provided by the various embodiments, the user group may be obtained according to the relationship between the user identifications and the file identifications that are included in the history playing record, and the user identifications of users with similar preferences are divided into the same user group. In this case, a file may be recommended to a current user identification according to a user group to which the current user identification belongs, rather than according to all user identifications. Because it is considered that the preferences of a user having the current user identification may be different from the preferences of users having other user identifications, recommendation efficiency and recommendation success rate can be improved.

According to various embodiments, a process of recommending the file according to the at least one user group includes:

receiving a file opening instruction, wherein the file opening instruction contains a current user identification and a current file identification;

determining a designated user group to which the current user identification belongs according to the at least one user identification included in each user group, wherein each user group is obtained according to the relationship between the user identifications and the file identifications included in the history playing record;

determining a to-be-recommended file identification according to the designated user group and the relationship between the user identifications and the file identifications; and recommending the file corresponding to the determined to-be-recommended file identification.

According to various embodiments, a process of creating the two-dimensional matrix according to the user identifications and the file identifications included in the history playing record includes:

obtaining the number of file identifications corresponding to each user identification included in the history playing record;

when the number of the file identifications corresponding to the user identification is larger than a predefined threshold, determining the user identification as a sample user identification; and creating the two-dimensional matrix according to sample user identifications and the file identifications included in the history playing record, wherein the sample user identifications are the first dimension of the two-dimensional matrix and the file identifications are the second dimension of the two-dimensional matrix.

According to various embodiments, a process of filling the element location corresponding to the relationship between the user identifications and the file identifications in the two-dimensional matrix with the element includes:

when the history playing record includes a relationship between a sample user identification and a file identification, filling an element location corresponding to the relationship between the sample user identification and the file identification in the two-dimensional matrix with a first predefined threshold, wherein the user identifications are the first dimension of the two-dimensional matrix and the file identifications are the second dimension of the two-dimensional matrix; and when element locations corresponding to a relationship between all sample user identifications and file identifications included in the history playing record have been filled, randomly selecting an element location from reserved element locations in the two-dimensional matrix, and filling the selected element location with a second predefined threshold, wherein the number of the selected element locations is the same as the number of element locations filled with the first predefined threshold.

According to various embodiments, a process of decomposing the two-dimensional matrix to obtain the designated matrix includes:

determining a weight of the element location filled with the first predefined threshold as a first weight, and determining a weight of the element location with the second predefined threshold as a second weight;

performing Singular Value Decomposition (SVD) for the two-dimensional matrix through a Stochastic Gradient Descent (SGD) algorithm according to the first weight and the second weight to obtain a U matrix; and determining the U matrix as the designated matrix.

According to various embodiments, after performing the SVD for the two-dimensional matrix through the SGD algorithm according to the first weight and the second weight to obtain the U matrix, the method further includes reducing dimensions of a second dimension of the U matrix according to the predefined number of to-be-reserved dimensions, and determining the U matrix whose dimensions have been reduced as the designated matrix.

According to various embodiments, a process of determining the to-be-recommended file identification according to the designated user group and the relationship between the user identifications and the file identifications includes:

determining the number of user identifications corresponding to each file identification in the designated user group according to the relationship between the user identifications and the file identifications; and arranging the determined numbers in a descending order, and determining the to-be-recommended file identification according to the arranged numbers, wherein the number of the to-be-recommended file identifications is predefined.

According to various embodiments, a process of determining the to-be-recommended file identification according to the designated user group and the relationship between the user identifications and the file identifications includes:

calculating a similarity degree between the current user identification and each user identification in the designated user group except the current user identification according to the feature vector corresponding to each user identification;

determining a user identification having a largest similarity degree with the current user identification; and determining a file identification corresponding to the user identification having the largest similarity degree according to the relationship between the user identifications and the file identifications.

According to various embodiments, the first predefined threshold is 1, the second predefined threshold is 0, and the first weight is larger than the second weight.

The methods provided by the above embodiments may be combined randomly to form a new embodiment of the present disclosure, which will not be illustrated herein.

Figure 2:
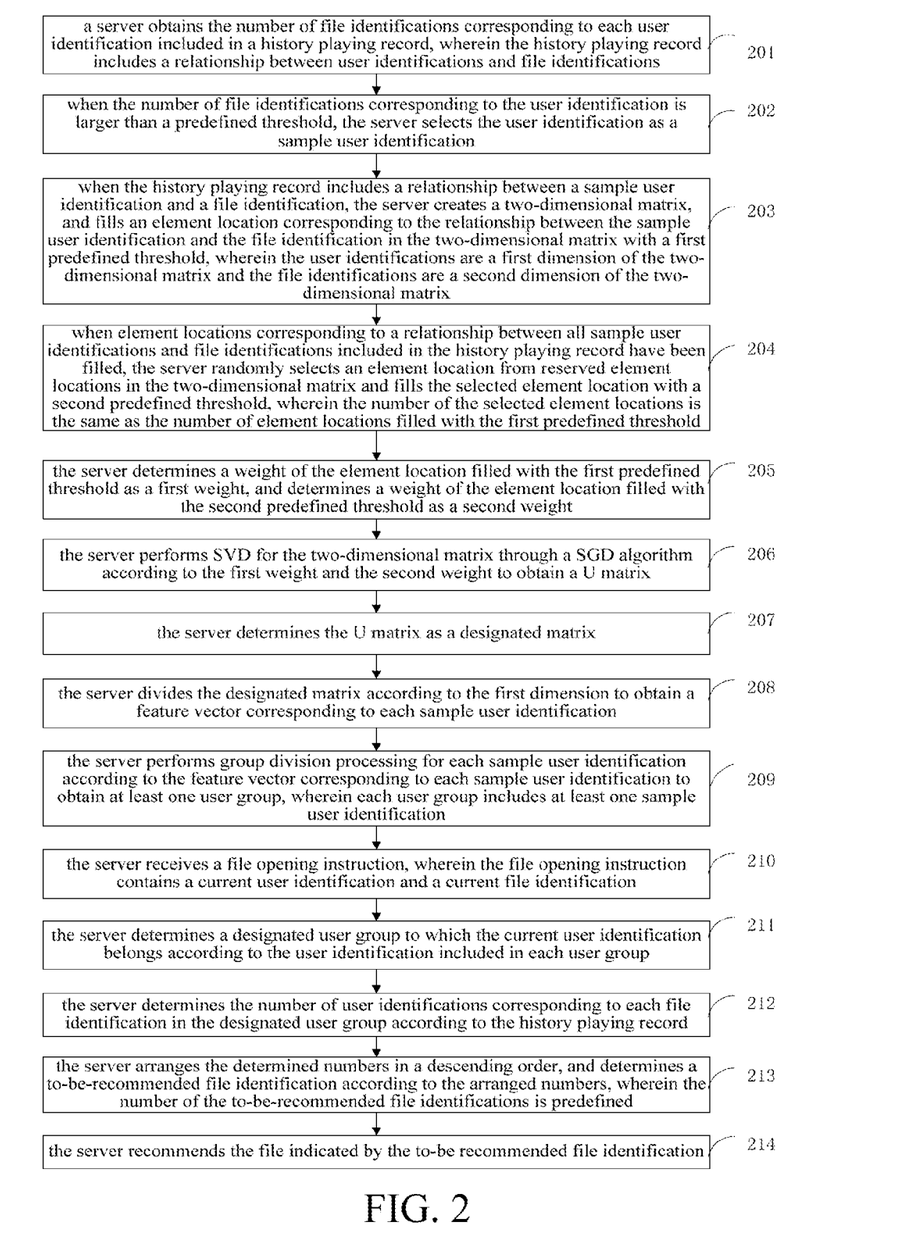
FIG. 2 is a flowchart illustrating a file recommendation method according to various embodiments.

FIG. 2 is a flowchart illustrating a file recommendation method according to various embodiments of the present disclosure. As shown in FIG. 2, the method includes following blocks.

Block 201: A server obtains the number of file identifications corresponding to each user identification included in a history playing record, wherein the history playing record includes a relationship between user identifications and file identifications. The various embodiments of the present disclosure may be applied to a scenario in which the server divides user identifications into user groups according to a history playing record and recommends a file according to the user groups. The server may be a server associated with a current file identification, or a function module in a server associated with the current file identification, which is not limited in the embodiments of the present disclosure.

According to various embodiments, the server records files opened by each user identification. When a user identification opens a file, the server establishes a relationship between the user identification and a file identification corresponding to the opened file in a history playing record. According to various embodiments, the user identification opening the file refers to when a user corresponding to the user identification opens the file through a terminal device. The history playing record may be a history playing record with a predefined length stored by the server. That is, when the length of any relationship in the history playing record is larger than the predefined length, the relationship is deleted. The file may be a video file, an audio file, or a text file provided by the server. For example, a network video file provided by a video website server, an audio file provided by an audio website server, or a network file provided by a file sharing server, which is not limited in the embodiments of the present disclosure.

The user identification may be a user account or a terminal identification. The file identification may be a file name or a file number. The file indicated by the file identification may be a video file, an audio file, a text file, or another type of file. The history playing record may include a relationship between user identifications and multiple types of file identifications, which is not limited in the embodiments of the present disclosure.

According to various embodiments, if the server may provide multiple types of files, the server may maintain the history playing record for the multiple types of files. For example, the server may record a relationship between a user identification and a video file identification and record a relationship between a user identification and an audio file identification. For a designated type of file, the server may divide user identifications into multiple user groups according to a history playing record corresponding to the designated type of file. When the current user identification opens the designated type of file, the server may recommend the designated type of file according to the multiple user groups. The multiple user groups may be obtained through dividing the user identifications according to the history playing record corresponding to the designated type of file. Compared with user groups obtained through dividing the user identifications according to a history playing record corresponding to all types of files, the multiple user groups corresponding to the designated type of file can reflect the preferences of the user for the designated type of file more easily, thereby improving a recommendation success rate when recommending the designated type of file.

According to various embodiments, if the number of file identifications opened by a user identification included in the history playing record is small, the relationship between the user identification and the file identifications may not reflect the preferences of the user accurately, and thus the user identification may influence the accuracy of user group division. In order to improve the accuracy of user group division, the server may select a sample user identification according to the number of file identifications corresponding to each user identification and perform user group division according to the selected sample user identification. Accordingly, the server needs to obtain the number of file identifications corresponding to each user identification in the history playing record first.

Block 202: When the number of file identifications corresponding to the user identification is larger than a predefined threshold, the server selects the user identification as a sample user identification. When obtaining the number of file identifications corresponding to each user identification in the history playing record, the server determines whether the number of file identifications corresponding to each user identification is larger than the predefined threshold. When the number of file identifications corresponding to the user identification is larger than the predefined threshold, the server selects the user identification as the sample user identification. When the number of file identifications corresponding to the user identification is smaller than or equal to the predefined threshold, the server discards the user identification or omits the user identification temporally and selects the user identification as the sample user identification when the number of file identifications corresponding to the user identification is larger than the predefined threshold.

According to various embodiments, the number of file identifications corresponding to the user identification refers to the number of files opened by the user identification. When the number of files opened by the user identification is larger than the predefined threshold, it is deemed that the relationship between the use identification and the file identifications can reflect the preferences of the user and can be used in the user group division.

For example, in the history playing record, the number of file identifications corresponding to a user identification A is 3, the number of file identifications corresponding to a user identification B is 25, and the predefined threshold is 10. Accordingly, the server selects the user identification B instead of the user identification A as the sample user identification.

According to various embodiments, the predefined threshold may be set by a technical staff in advance, or may be determined by the server according to the number of file identifications corresponding to each user identification in the history playing record, which is not limited in the embodiments of the present disclosure.

It should be noted that blocks 201 and 202 are optional, and the server may select all user identifications included in the history playing record as sample user identifications and directly perform block 203, which is not limited in the embodiments of the present disclosure.

Block 203: When the history playing record includes a relationship between a sample user identification and a file identification, the server creates a two-dimensional matrix and fills an element location corresponding to the relationship between the sample user identification and the file identification in the two-dimensional matrix with a first predefined threshold, wherein the user identifications are a first dimension of the two-dimensional matrix and the file identifications are a second dimension of the two-dimensional matrix.

In the two-dimensional matrix, the user identifications are the first dimension, the file identifications are the second dimension, and each element in the two-dimensional matrix is determined according to the relationship between the user identifications and the file identifications. When the history playing record includes a relationship between a sample user identification and a file identification, it is indicated that the user identification has opened a file indicated by the file identification, and the server fills an element location corresponding to the relationship between the sample user identification and the file identification with the first predefined threshold. When the history playing record does not include the relationship between the sample user identification and the file identification, it is indicated that the user identification has not opened the file indicated by the file identification, and the server does not fill the element location corresponding to the relationship between the sample user identification and the file identification with the first predefined threshold.

According to various embodiments, the first dimension indicates the row of the two-dimensional matrix and the second dimension indicates the column of the two-dimensional matrix. That is, the row of the two-dimensional matrix is the user identification and the column of the two-dimensional matrix is the file identification. Or, the first dimension indicates the column of the two-dimensional matrix and the second dimension indicates the row of the two-dimensional matrix. That is, the column of the two-dimensional matrix is the user identification and the row of the two-dimensional matrix is the file identification. In the embodiments of the present disclosure, the first dimension and the second dimension are not limited.

According to various embodiments, the first predefined threshold may be 1.

For example, the relationship between the user identifications and the file identifications in the history playing record is shown in Table 1. In Table 1, a symbol "√" represents that the relationship between the user identifications and the file identifications has been established.

TABLE 1

| | file identification 1 | file identification 2 | file identification 3 |
|---|---|---|---|
| sample user identification A | √ | | |
| sample user identification B | | √ | √ |
| sample user identification C | √ | | |

Suppose the first dimension indicates the row of the two-dimensional matrix, the second dimension indicates the column of the two-dimensional matrix, and the first predefined threshold is 1. The sample user identification A, the sample user identification B, and the sample user identification C correspond to the first row, the second row, and the third row of the two-dimensional matrix, respectively, and the file identification A, the file identification B, and the file identification C correspond to the first column, the second column, and the third column of the two-dimensional matrix, respectively. Accordingly, after being filled with the first predefined threshold, the two-dimensional matrix is $$\begin{bmatrix} 1, X, X \\ X, 1, 1 \\ 1, X, X \end{bmatrix},$$

wherein X represents unfilled element locations.

Block 204: When element locations corresponding to a relationship between all sample user identifications and file identifications included in the history playing record have been filled, the server randomly selects an element location from reserved element locations in the two-dimensional matrix and fills the selected element location with a second predefined threshold, wherein the number of the selected element locations is the same as the number of element locations filled with the first predefined threshold.

After filling the element locations corresponding to the relationship between all sample user identifications and file identifications included in the history playing record, the server obtains the number of the element locations filled with the first predefined threshold, randomly selects the element location from the reserved element locations in the two-dimensional matrix, and fills the selected element location with the second predefined threshold, wherein the number of the selected element locations is the same as the number of the element locations filled with the first predefined threshold.

According to various embodiments, the second predefined threshold may be 0.

According to the example of block 203, when the second predefined threshold is 0 and after the two-dimensional matrix is filled with the first predefined threshold and the second predefined threshold, the two-dimensional matrix is $$\begin{bmatrix} 1, 0, X \\ 0, 1, 1 \\ 1, 0, 0 \end{bmatrix}.$$

Block 205: The server determines a weight of the element location filled with the first predefined threshold as a first weight and determines a weight of the element location filled with the second predefined threshold as a second weight. According to various embodiments, it can be deemed that the file opened by the user identification is liked by the user and the file not opened by the user may be liked or may not be liked by the user. The server may assign a weight for element locations in the two-dimensional matrix, so as to perform machine study according to the weights of the element locations in the two-dimensional matrix. According to various embodiments, the first weight is larger than the second weight. For example, the first weight is 0.7 and the second weight is 0.3.

Block 206: The server performs SVD for the two-dimensional matrix through a SGD algorithm according to the first weight and the second weight to obtain a U matrix. A process of performing the SVD for the two-dimensional matrix includes: $A=USV^T$, wherein A is the two-dimensional matrix, U and V are orthogonal matrixes, and S is a diagonal matrix. According to various embodiments, the two-dimensional matrix may include multiple unfilled element locations, that is, the two-dimensional matrix is a sparse matrix. Accordingly, when performing the SVD for the two-dimensional matrix, the server may perform machine study through the SGD algorithm and perform prediction for missing elements in the two-dimensional matrix to obtain the U matrix.

It should be noted that block 206 is optional, and the server may decompose the two-dimensional matrix and perform machine study through another method, which is not limited in the embodiments of the present disclosure.

Block 207: The server determines the U matrix as a designated matrix. According to various embodiments, the server determines the U matrix as the designated matrix, so as to perform user group division according to the designated matrix. According to various embodiments, block 207 may be replaced with a following process where the server reduces dimensions of the second dimension of the U matrix according to the predefined number of to-be-reserved dimensions, and determines the U matrix whose dimensions have been reduced as the designated matrix.

The server may set the predefined number K of the to-be reserved dimensions, reduce the dimensions of the second dimension of the U matrix according to the predefined number K to obtain the designated matrix, wherein the number of dimensions of the second dimension of the designated matrix is K. The predefined number K of the to-be-reserved dimensions may be set by a technical staff, or may be determined according to predication accuracy that is obtained by the server through performing multiple experiments for different predefined numbers, which is not limited in the embodiments of the present disclosure.

In the embodiment, through reducing the dimensions of the U matrix, sample data can be generalized effectively, calculation amount can be reduced, and an over-fitting phenomenon may be avoided.

If the second dimension indicates the column of the U matrix and the predefined number K of to-be-reserved dimensions is 8, the server reserves the first 8 columns of the U matrix, deletes other columns, and determines the reserved matrix as the designated matrix.

Block 208: The server divides the designated matrix according to the first dimension to obtain a feature vector corresponding to each sample user identification. According to various embodiments, the first dimension of the designated matrix represents the sample user identification and the server divides the designated matrix according to the first dimension to obtain multiple vectors and takes each vector as the feature vector corresponding to each sample user identification. For example, if the first dimension is the row of the designated matrix, the server divides the row of the designated matrix to obtain multiple row vectors and takes each row vector as the feature vector corresponding to each sample user identification.

According to the example of block 203, suppose the designated matrix is $$\begin{bmatrix} -0.4472, & -0.53732, & -0.0064 \\ -0.3586, & 0.2461, & 0.8622 \\ -0.2925, & -0.4033, & -0.2275 \end{bmatrix},$$

the feature vector corresponding to the sample user identification A is [−0.4472, −0.5373, −0.0064], the feature vector corresponding to the sample user identification B is [−0.3586, 0.2461, 0.8622], and the feature vector corresponding to the sample user identification C is [−0.2925, −0.4033, −0.2275].

Block 209: The server performs group division processing for each sample user identification according to the feature vector corresponding to each sample user identification to obtain at least one user group, wherein each user group includes at least one sample user identification. The server performs the group division processing for each sample user identification according to the feature vector corresponding to each sample user identification through a clustering algorithm to obtain at least one user group, wherein each user group includes at least one sample user identification. According to various embodiments, the clustering algorithm may be a division method or an arrangement method, which is not limited in the embodiments of the present disclosure.

According to various embodiments, the sever may set the number C of user groups and performs group division processing for each sample user identification according to the number C of user groups to obtain C user groups. The number C of user groups may be determined by the server according to group division precision and the number of sample user identifications, which is not limited in the embodiments of the present disclosure.

It should be noted that, in the embodiments of the present disclosure, block 210 is performed after block 209. In various embodiments, blocks 201 to 209 may be performed immediately or periodically. Block 210 and blocks 201 to 209 have no necessary sequential relationship. The server may recommend a file according to multiple currently obtained user groups when receiving a file opening instruction. If blocks 201 to 209 are performed immediately, when any user identification opens a file, the server updates the history playing record, and performs blocks 201 to 209 again to divide the user identifications into multiple user groups. The server may recommend a file according to the multiple user groups when receiving a file opening instruction.

Block 210: The server receives a file opening instruction, wherein the file opening instruction contains a current user identification and a current file identification. According to various embodiments, when receiving the file opening instruction, the server opens a file indicated by the current file identification according to the current user identification. At this case, the server may recommend the file according to the current user identification and the current file identification.

Block 211: The server determines a designated user group to which the current user identification belongs according to the user identification included in each user group. According to various embodiments, the server divides multiple user identifications into multiple user groups, wherein each user group includes at least one user identification, and user identifications in the same user group have similar preferences. The server may recommend a file according to a file identification corresponding to a user identification having similar preferences with the current user identification, rather than recommend the file according to file identifications corresponding to all user identifications. The server determines the user group to which the current user identification belongs according to the user identification included in each user group, and determines the user group to which the current user identification belongs as the designated user group, so as to recommend the file based on the designated user group.

Block 212: The server determines the number of user identifications corresponding to each file identification in the designated user group according to the history playing record. According to various embodiments, a file identification included in the history playing record may correspond to a user identification included in the designated user group, or correspond to a user identification not included in the designated user group. Accordingly, the server calculates the number of user identifications that are included in the designated user group and correspond to the file identification. The number of the user identifications represents the number of user identifications opening the file indicated by the file identification in the user group.

Block 213: The server arranges the determined numbers in a descending order, and determines a to-be-recommended file identification according to the arranged numbers, wherein the number of the to-be-recommended file identifications is predefined. The predefined number may be set by the server in advance, or may be determined by the server according to the number of files that can be displayed in a recommendation region on a current display interface, which is not limited in the embodiments of the present disclosure. The server arranges the file identifications corresponding to the user identifications in a descending order of the determined numbers, and determines first N file identifications, wherein N is a predefined positive integer.

According to various embodiments, in the designated user group, the more the user identifications opening a file, the more possible the file is of interest to the current user. Accordingly, the server should recommend the file. Accordingly, the server can improve the recommendation success rate through recommending the file corresponding to the determined first N file identifications, wherein N is a predefined positive integer.

It should be noted that blocks 212 and 213 are optional, and the server may determine the to-be-recommended file identification through other methods, which is not limited in the embodiments of the present disclosure.

In various embodiments, blocks 212 and 213 may be replaced by following processes.

At process (I), the server calculates a similarity degree between the current user identification and each user identification in the designated user group except the current user identification according to a feature vector corresponding to the user identification.

The server may calculate a cosine angle or a Pearson correlation coefficient between the feature vector of each user identification and the feature vector of current user identification, to represent the similarity degree between the current user identification and each user identification, except the current user identification. A method of calculating the similarity degree is not limited in the embodiments of the present disclosure.

At process (II), the server determines a user identification having a largest similarity degree with the current user identification.

If a cosine angle between a feature vector of a user identification and the feature vector of the current user identification is the largest, the server may determine the user identification as the user identification having the largest similarity degree with the current user identification. Or, if an absolute value of a Pearson correlation coefficient between a feature vector of a user identification and the feature vector of the current user identification is the largest, the server may determine the user identification as the user identification having the largest similarity degree with the current user identification.

According to various embodiments, the user identification having the largest similarity degree with the current user identification may be determined as a user identification having preferences most similar to the preferences of the current user identification. Accordingly, the server may recommend a file according to a file identification corresponding to the user identification having the largest similarity degree.

At process (III), the server determines a file identification corresponding to the user identification having the largest similarity degree according to the relationship between the user identifications and the file identifications, and block 214 is performed.

The server determines each file identification corresponding to the user identification having the largest similarity degree according to the relationship between the user identifications and the file identifications and determines each file identification corresponding to the current user identification, compares the determined file identifications, and determines a file identification corresponding to the user identification having the largest similarity degree but not corresponding to the current user identification.

For example, in the designated user group, the user identification B and the user identification A have the largest similarity degree. The server determines, according to the relationship between the user identifications and the file identifications, that the user identification B opens the file identification 1, but the user identification A does not open the file identification 1, and thus, recommends a file indicated by the file identification 1.

According to various embodiments, the history playing record includes a relationship between a user identification and a first file identification and a relationship between the user identification and a second file identification. The second file identification is a file identification opened by the user identification after the user identification opens the first file identification. Accordingly, blocks 212 and 213 may be replaced by following processes. The server determines second file identifications corresponding to the current file identification and each file identification in the designated user group according to the relationship between the user identification and the first file identification and the relationship between the user identification and the second file identification, calculates the number of obtained second file identifications, calculates the number of second file identifications, arranges the calculated numbers in a descending order, and determines the second file identifications, wherein the number of the second file identifications is predefined.

The server determines the second file identifications opened by each user identification in the designated user group according to the relationship between the user identification and the first file identification and the relationship between the user identification and the second file identification after the user identification opens the current file identification. The more files indicated by a second file identification opened after the current file identification is opened, the higher a correlation degree between the file and the current file identification is, and the more possible the file is interested by the current user. Accordingly, the server should recommend the file.

According to various embodiments, the server determines the to-be recommended file identification through an Association Rules (AR) algorithm or a Collaborative Filtering (CF) algorithm, so as to recommend the file indicated by the to-be recommended file identification.

Block 214: The server recommends the file indicated by the to-be recommended file identification. According to various embodiments, when recommending the file indicated by the determined file identification, the server may provide a link address of the determined file identification on a display interface of the currently opened file. The link address may be used to jump to the file indicated by the determined file identification. The server may also display a thumbnail of the file indicated by the determined file identification or display a poster posting time and so on, which is not limited in the embodiments of the present disclosure.

If there are multiple determined file identifications, the server may recommend files in turn according to the number of user identifications corresponding to each file identification in the designated user group, or recommend files according to posting time of the files, which is not limited in the embodiments of the present disclosure.

By the method and device provided by the embodiments of the present disclosure, the user group may be obtained according to the relationship between the user identifications and the file identifications that is included in the history playing record, and the user identifications of users with similar preferences are divided into the same user group. In this case, a file may be recommended to a current user identification according to a user group to which the current user identification belongs, rather than according to all user identifications. Because it is considered that the preferences of a user having the current user identification may be different from the preferences of users having other user identifications, recommendation efficiency and recommendation success rate can be improved. Further, the server selects sample user identifications according to the number of file identifications corresponding to the user identification, and assigns weights for the first predefined threshold and the second predefined threshold filled into the two-dimensional matrix, thereby improving the accuracy of user group division. Through reducing dimensions of the U matrix, sample data can be generalized effectively, calculation amount can be reduced, and an over-fitting phenomenon may be avoided.

Figure 3:
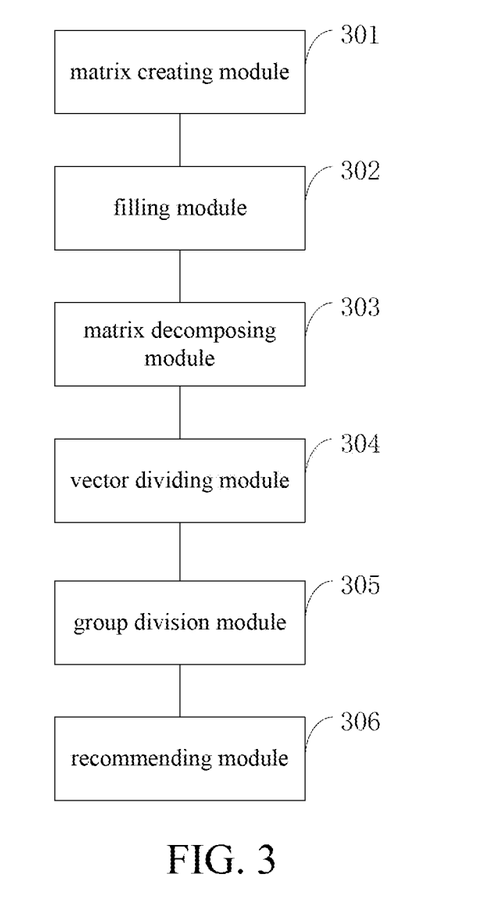
FIG. 3 is a diagram illustrating the structure of a file recommendation device according to various embodiments.

FIG. 3 is a diagram illustrating the structure of a file recommendation device according to various embodiments of the present disclosure. As shown in FIG. 3, the device includes a matrix creating module 301, a filling module 302, a matrix decomposing module 303, a vector dividing module 304, a group division module 305, and a recommending module 306.

The matrix creating module 301 may create a two-dimensional matrix according to user identifications and file identifications included in a history playing record, wherein the user identifications are a first dimension of the two-dimensional matrix and the file identifications are a second dimension of the two-dimensional matrix. The filling module 302 is connected to the matrix creating module 301, and may fill an element location corresponding to a relationship between the user identifications and the file identifications in the two-dimensional matrix with an element. The matrix decomposing module 303 is connected with the filling module 302, and may decompose the two-dimensional matrix to obtain a designated matrix. The vector dividing module 304 is connected with the matrix decomposing module 303, and may divide the designated matrix according to the first dimension to obtain a feature vector corresponding to each user identification. The group division module 305 is connected with the vector dividing module 304, and may perform group division processing for each user identification according to the feature vector corresponding to the user identification to obtain at least one user group, wherein each user group includes at least one user identification. The recommending module 306 is connected with the group division module 305, and may recommend a file according to the at least one user group.

According to various embodiments, the recommending module 306 includes:

an instruction receiving unit, to receive a file opening instruction, wherein the file opening instruction contains a current user identification and a current file identification;

a designated group determining unit, to determine a designated user group to which the current user identification belongs according to the at least one user identification included in each user group, wherein each user group is obtained according to the relationship between the user identifications and the file identifications included in the history playing record;

a file identification determining unit, to determine a to-be-recommended file identification according to the designated user group and the relationship between the user identifications and the file identifications; and a recommending unit, to recommend the file corresponding to the determined to-be-recommended file identification.

According to various embodiments, the matrix creating module 301 includes:

a number obtaining unit, to obtain the number of file identifications corresponding to each user identification included in the history playing record;

a sample determining unit, when the number of the file identifications corresponding to the user identification is larger than a predefined threshold, to determine the user identification as a sample user identification;

a matrix creating unit, to create the two-dimensional matrix according to sample user identifications and the file identifications included in the history playing record, wherein the sample user identifications are the first dimension of the two-dimensional matrix and the file identifications are the second dimension of the two-dimensional matrix.

In an example, the filling module 302 includes:

a first filling unit, when the history playing record includes a relationship between a sample user identification and a file identification, to fill an element location corresponding to the relationship between the sample user identification and the file identification in the two-dimensional matrix with a first predefined threshold, wherein the user identifications are the first dimension of the two-dimensional matrix and the file identifications are the second dimension of the two-dimensional matrix; and a second filling unit, when element locations corresponding to a relationship between all sample user identifications and file identifications included in the history playing record have been filled, to randomly select an element location from reserved element locations in the two-dimensional matrix, and fill the selected element location with a second predefined threshold, wherein the number of the selected element locations is the same as the number of element locations filled with the first predefined threshold.

According to various embodiments, the matrix decomposing module 303 includes:

a weight determining unit, to determine a weight of the element location filled with the first predefined threshold as a first weight, and determine a weight of the element location with the second predefined threshold as a second weight;

a decomposing unit, to perform Singular Value Decomposition (SVD) for the two-dimensional matrix through a Stochastic Gradient Descent (SGD) algorithm according to the first weight and the second weight to obtain a U matrix; and a designated matrix determining unit, to determine the U matrix as the designated matrix.

According to various embodiments, the device further includes a dimensions reducing module to reduce dimensions of a second dimension of the U matrix according to the predefined number of to-be-reserved dimensions and determine the U matrix whose dimensions have been reduced as the designated matrix.

According to various embodiments, the file identification determining unit includes:

a user identification number determining sub-unit to determine the number of user identifications corresponding to each file identification in the designated user group according to the relationship between the user identifications and the file identifications; and a first file identification determining sub-unit to arrange the determined numbers in a descending order and determine the to-be-recommended file identification, wherein the number of the to-be-recommended file identifications is predefined.

According to various embodiments, the file identification determining unit includes:

a similarity degree calculating sub-unit to calculate a similarity degree between the current user identification and each user identification except the current user identification in the designated user group according to the feature vector corresponding to each user identification;

a user identification determining sub-unit to determine a user identification having a largest similarity degree with the current user identification; and a second file identification determining sub-unit, to determine a file identification corresponding to the user identification having the largest similarity degree according to the relationship between the user identifications and the file identifications.

According to various embodiments, the first predefined threshold is 1, the second predefined threshold is 0, and the first weight is larger than the second weight.

By the device provided by the embodiments of the present disclosure, the user group may be obtained according to the relationship between the user identifications and the file identifications that is included in the history playing record, and the user identifications of users with similar preferences are divided into the same user group. In this case, a file may be recommended to a current user identification according to a user group to which the current user identification belongs, rather than according to all user identifications. Because it is considered that the preferences of a user having the current user identification may be different from the preferences of users having other user identifications, recommendation efficiency and recommendation success rate can be improved.

The file recommendation device provided by the above embodiments has been described according to the above-mentioned modules. In an actual application, the functions of the above-mentioned modules may be implemented by different modules. That is, the modules of the file recommendation device may be different from the above mentioned modules, thereby implementing part or all of the above functions. In addition, the file recommendation device and the file recommendation method belong to the same method, referring to the above method embodiments, and will not be described herein.

Figure 4:
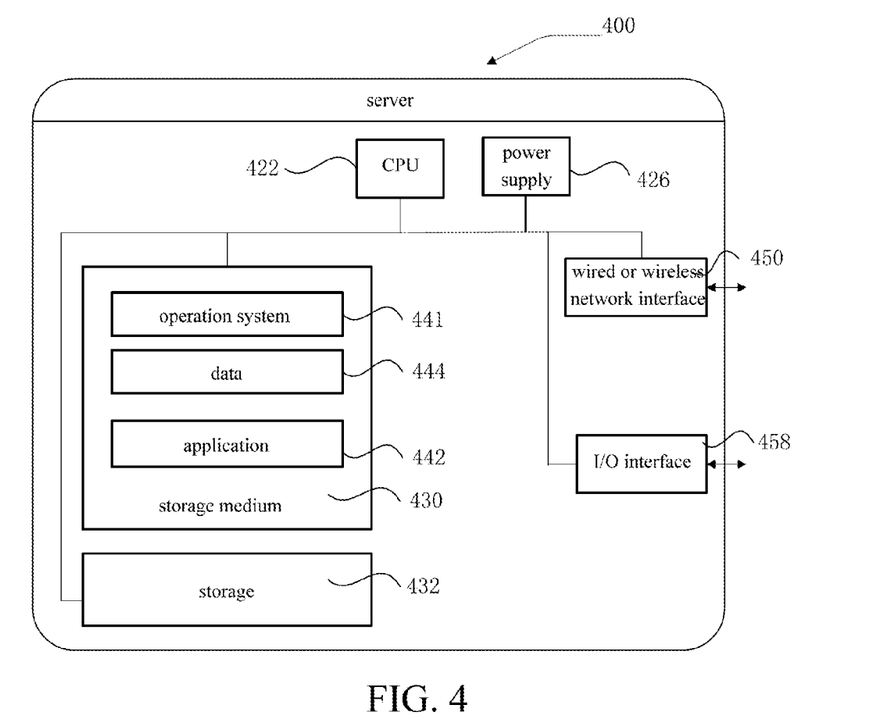
FIG. 4 is a diagram illustrating the structure of a server according to various embodiments.

FIG. 4 is a diagram illustrating the structure of a server according to various embodiments of the present disclosure. The server 400 may have different functions because of different configurations or performances. The server 400 may include one or more Central Processing Units (CPU) 422 (for example, one or more processors) and a storage 432, one or more storage mediums 430 for storing applications 442 or data 444 (for example, one or more mass storage devices). The storage 432 and the storage medium 430 may be transitory storage or non-transitory storage. Applications stored in the storage medium 430 may include one or more modules (not shown in drawings), and each module may include a series of instruction operations of the server. Further, the CPU 422 may be configured to communicate with the storage medium 430, and execute the instruction operations stored in the storage medium 430 in the server 400.

The server 400 may further include one or more power supplies 426, one or more wired or wireless network interfaces 450, one or more Input/Output (I/O) interfaces 458, and/or one or more operation systems 441, for example, Windows Server™, Mac OS X™, Unix™, Linux™, FreeBSD™ and so on.

The processes performed by the server in the above embodiments may be based on the structure of the server shown in FIG. 4.

Those skilled in the art will understand that all or part of the processes in the various embodiments of the present disclosure can be implemented by hardware, or by instructing related hardware by a program, the program may be stored in a readable storage medium of a computer. The readable storage medium includes a ROM/RAM, a disk, a Compact Disc (CD), and so on.

In various embodiments, the storage medium includes matrix creating instructions, filling instructions, matrix decomposing instructions, vector dividing instructions, group division instructions, and recommending instructions that can be executed by the CPU 422. The storage medium 430 may be a non-transitory computer readable storage medium, and the matrix creating instructions, the filling instructions, the matrix decomposing instructions, the vector dividing instructions, the group division instructions, and the recommending instructions may be machine readable instructions stored in the storage medium 430. The CPU 422 may execute the machine readable instructions stored in the storage medium 430 to implement method and device functions in the above embodiments.

For example, the CPU 422 may execute the matrix creating instructions to implement a process of creating a two-dimensional matrix according to user identifications and file identifications included in a history playing record, wherein the user identifications are a first dimension of the two-dimensional matrix and the file identifications are a second dimension of the two-dimensional matrix. The CPU 422 may execute the filling instructions to implement a process of filling an element location corresponding to a relationship between the user identifications and the file identifications in the two-dimensional matrix with an element. The CPU 422 may execute the matrix decomposing instructions to implement a process of decomposing the two-dimensional matrix to obtain a designated matrix. The CPU 422 may execute the vector dividing instructions to implement a process of dividing the designated matrix according to the first dimension to obtain a feature vector corresponding to each user identification The CPU 422 may execute the group division instructions to implement a process of performing group division processing for each user identification according to the feature vector corresponding to the user identification to obtain at least one user group, wherein each user group includes at least one user identification. The CPU 422 may execute the recommending instructions to implement a process of recommending a file according to the at least one user group.

The foregoing are preferred examples of the present disclosure and are not used to limit the protection scope of the present disclosure. Any modification, equivalent substitution, and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more processes within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A file recommendation method implemented by a server, comprising:
creating a two-dimensional matrix according to user identifications and file identifications included in a history playing record, wherein the user identifications are a first dimension of the two-dimensional matrix and the file identifications are a second dimension of the two-dimensional matrix;
when the history playing record includes a relationship between sample user identifications and the file identifications, inserting a first predefined threshold into the two-dimensional matrix at an element location corresponding to the relationship between the sample user identifications and the file identifications;
when the first predefined threshold has been inserted into element locations corresponding to the relationship between all the sample user identifications and the file identifications included in the history playing record, randomly selecting an element location from reserved element locations in the two-dimensional matrix, and inserting a second predefined threshold into the selected element location, wherein a number of the selected element locations is the same as a number of element locations having the first predefined threshold;
decomposing the two-dimensional matrix to obtain a designated matrix;
dividing the designated matrix according to the first dimension to obtain a feature vector corresponding to each user identification;
performing group division processing for each user identification according to the feature vector corresponding to the user identification to obtain at least one user group, wherein each user group includes at least one user identification; and
recommending a file according to the at least one user group,
wherein decomposing the two-dimensional matrix to obtain the designated matrix includes:
determining a weight of the element location filled with the first predefined threshold as a first weight, and determining a weight of the element location with the second predefined threshold as a second weight;
performing Singular Value Decomposition (SVD) for the two-dimensional matrix through a Stochastic Gradient Descent (SGD) algorithm according to the first weight and the second weight to obtain a U matrix; and
determining the U matrix as the designated matrix,
wherein after performing the SVD for the two-dimensional matrix through the SGD algorithm according to the first weight and the second weight to obtain the U matrix, further includes:
reducing dimensions of a second dimension of the U matrix according to a predefined number of to-be-reserved dimensions, and determining the U matrix whose dimensions have been reduced as the designated matrix.

2. The method of claim 1, wherein recommending the file according to the at least one user group comprises:
receiving a file opening instruction, wherein the file opening instruction contains a current user identification and a current file identification;
determining a designated user group to which the current user identification belongs according to the at least one user identification included in each user group, wherein each user group is obtained according to the relationship between the user identifications and the file identifications included in the history playing record;
determining a to-be-recommended file identification according to the designated user group and the relationship between the user identifications and the file identifications; and
recommending the file corresponding to the determined to-be-recommended file identification.

3. The method of claim 1, wherein creating the two-dimensional matrix according to the user identifications and the file identifications included in the history playing record comprises:
   obtaining a number of file identifications corresponding to each user identification included in the history playing record;
   when the number of the file identifications corresponding to the user identification is larger than a predefined threshold, determining the user identification as the sample user identification; and
   creating the two-dimensional matrix according to the sample user identifications and the file identifications included in the history playing record, wherein the sample user identifications define the first dimension of the two-dimensional matrix and the file identifications define the second dimension of the two-dimensional matrix.

4. The method of claim 2, wherein determining the to-be-recommended file identification according to the designated user group and the relationship between the user identifications and the file identifications comprises:
   determining a number of user identifications corresponding to each file identification in the designated user group according to the relationship between the user identifications and the file identifications; and
   arranging the determined numbers in a descending order, and determining the to-be-recommended file identification, wherein the number of the to-be-recommended file identifications is predefined.

5. The method of claim 2, wherein determining the to-be-recommended file identification according to the designated user group and the relationship between the user identifications and the file identifications comprises:
   calculating a similarity degree between the current user identification and each user identification except the current user identification in the designated user group according to the feature vector corresponding to each user identification;
   determining a user identification having a largest similarity degree with the current user identification; and
   determining a file identification corresponding to the user identification having the largest similarity degree according to the relationship between the user identifications and the file identifications.

6. The method of claim 1, wherein the first predefined threshold is 1, the second predefined threshold is 0, and the first weight is larger than the second weight.

7. A file recommendation device, comprising at least one processor and at least one non-transitory storage, wherein the at least one non-transitory storage stores one or more computer readable instructions, and the processor executes the computer readable instructions stored in the non-transitory storage to:
   create a two-dimensional matrix according to user identifications and file identifications included in a history playing record, wherein the user identifications are a first dimension of the two-dimensional matrix and the file identifications are a second dimension of the two-dimensional matrix;
   when the history playing record includes a relationship between sample user identifications and the file identifications, insert a first predefined threshold into the two-dimensional matrix at an element location corresponding to the relationship between the sample user identifications and the file identifications;
   when the first predefined threshold has been inserted into element locations corresponding to the relationship between all the sample user identifications and the file identifications included in the history playing record, randomly select an element location from reserved element locations in the two-dimensional matrix, and insert a second predefined threshold into the selected element location, wherein a number of the selected element locations is the same as a number of element locations having the first predefined threshold;
   decompose the two-dimensional matrix to obtain a designated matrix;
   divide the designated matrix according to the first dimension to obtain a feature vector corresponding to each user identification;
   perform group division processing for each user identification according to the feature vector corresponding to the user identification to obtain at least one user group, wherein each user group includes at least one user identification; and
   recommend a file according to the at least one user group,
   wherein the processor executes the computer readable instructions stored in the non-transitory storage to
   determine a weight of the element location filled with the first predefined threshold as a first weight, and determine a weight of the element location with the second predefined threshold as a second weight;
   perform Singular Value Decomposition (SVD) for the two-dimensional matrix through a Stochastic Gradient Descent (SGD) algorithm according to the first weight and the second weight to obtain a U matrix; and
   determine the U matrix as the designated matrix
   wherein the processor executes the computer readable instructions stored in the non-transitory storage to further
   reduce dimensions of a second dimension of the U matrix according to a predefined number of to-be-reserved dimensions, and determine the U matrix whose dimensions have been reduced as the designated matrix.

8. The device of claim 7, wherein the processor executes the computer readable instructions stored in the non-transitory storage to
   receive a file opening instruction, wherein the file opening instruction contains a current user identification and a current file identification;
   determine a designated user group to which the current user identification belongs according to the at least one user identification included in each user group, wherein each user group is obtained according to the relationship between the user identifications and the file identifications included in the history playing record;
   determine a to-be-recommended file identification according to the designated user group and the relationship between the user identifications and the file identifications; and
   recommend the file corresponding to the determined to-be-recommended file identification.

9. The device of claim 7, wherein the processor executes the computer readable instructions stored in the non-transitory storage to
   obtain a number of file identifications corresponding to each user identification included in the history playing record;
   when the number of the file identifications corresponding to the user identification is larger than a predefined threshold, determine the user identification as a sample user identification; and create the two-dimensional matrix according to sample user identifications and the file identifications included in the history playing record, wherein the sample user identifications are the first dimension of the two-dimensional matrix and the file identifications are the second dimension of the two-dimensional matrix.

10. The device of claim 8, wherein the processor executes the computer readable instructions stored in the non-transitory storage to     determine a number of user identifications corresponding to each file identification in the designated user group according to the relationship between the user identifications and the file identifications; and     arrange the determined numbers in a descending order, and determine the to-be-recommended file identification, wherein the number of the to-be-recommended file identifications is predefined.

11. The device of claim 8, wherein the processor executes the computer readable instructions stored in the non-transitory storage to     calculate a similarity degree between the current user identification and each user identification except the current user identification in the designated user group according to the feature vector corresponding to each user identification;

determine a user identification having a largest similarity degree with the current user identification; and     determine a file identification corresponding to the user identification having the largest similarity degree according to the relationship between the user identifications and the file identifications.

12. The device of claim 7, wherein the first predefined threshold is 1, the second predefined threshold is 0, and the first weight is larger than the second weight.

\* \* \* \* \*